March 21, 1944.  W. R. WEEKS  2,344,842
TOASTER
Filed Dec. 12, 1941  3 Sheets-Sheet 1

Fig.1.

Fig.2.

Inventor:
Walter R. Weeks,
by Harry E. Dunham
His Attorney.

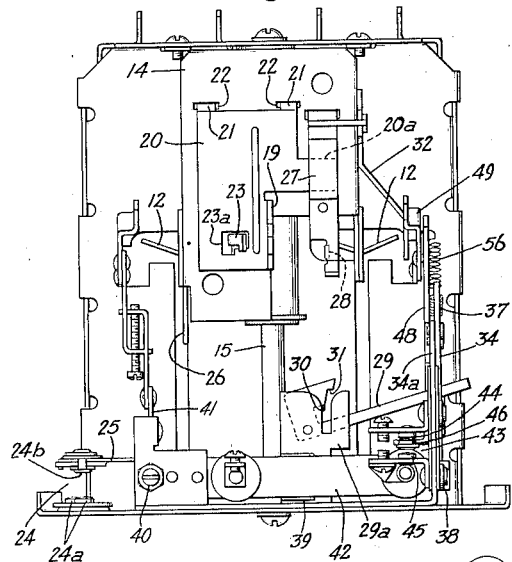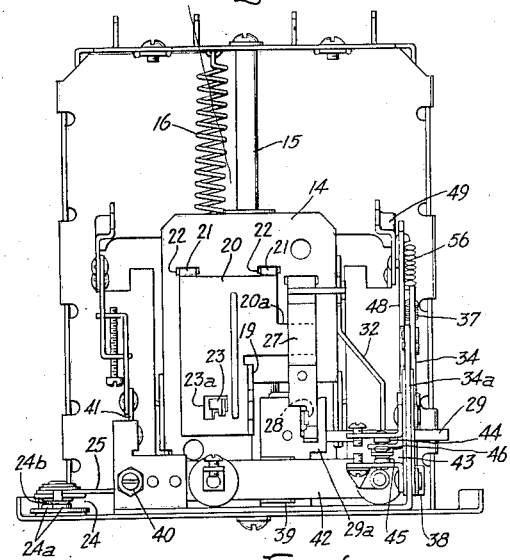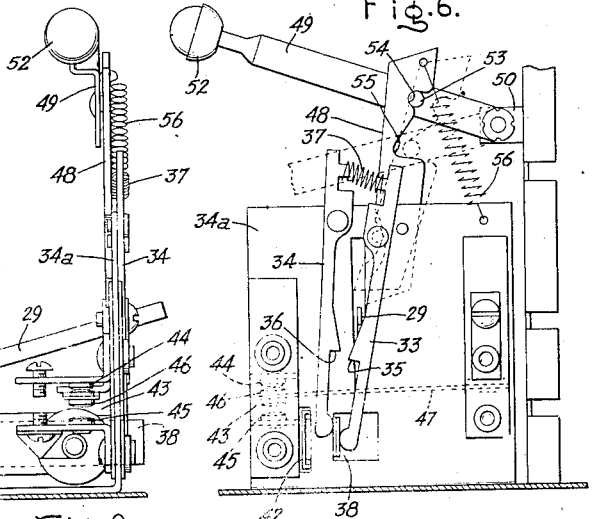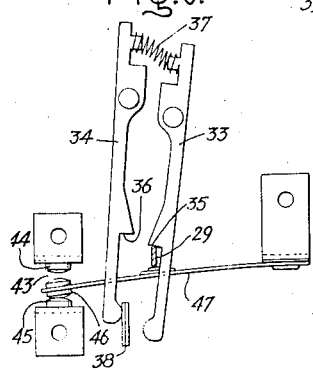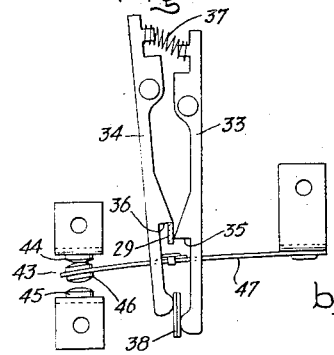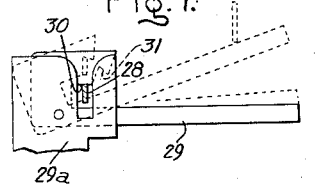

March 21, 1944.    W. R. WEEKS    2,344,842
TOASTER
Filed Dec. 12, 1941    3 Sheets-Sheet 3
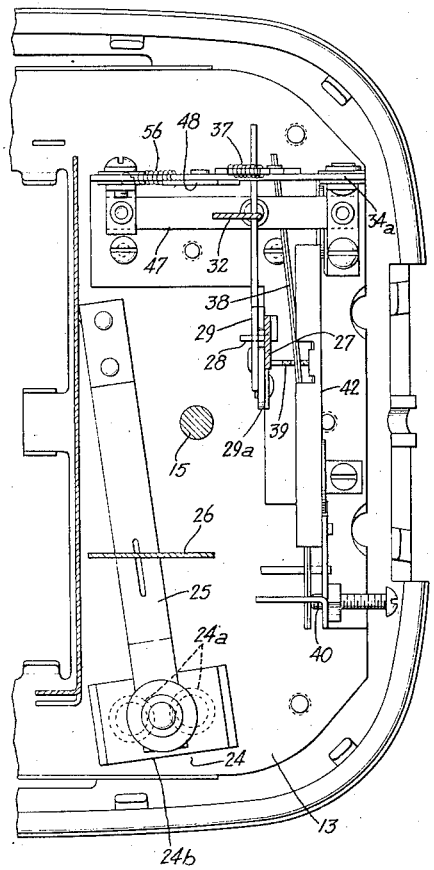
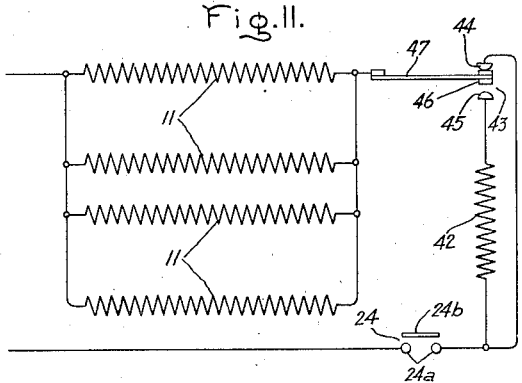
Inventor:
Walter R. Weeks,
by Harry E. Dunham
His Attorney.

Patented Mar. 21, 1944

2,344,842

UNITED STATES PATENT OFFICE 2,344,842

TOASTER

Walter R. Weeks, Hamden, Conn., assignor to General Electric Company, a corporation of New York Application December 12, 1941, Serial No. 422,612

3 Claims. (Cl. 99—329)

This invention relates to toasters, more particularly to bread toasters, and it has for its object the provision of an improved device of this character.

This invention is particularly applicable to automatic bread toasters in which a timing mechanism is used to control the toaster so as to deenergize the heating means and to eject the toasted slice at the end of the toasting period. And it is especially applicable to an automatic toaster of this character which is provided with a slice-holder which is movable to a toasting position in the toasting chamber where it is held until the end of the toasting period when it is automatically released by the timing mechanism and moved to a non-toasting position by suitable means, as by a biasing spring. The slice-holder when in its non-toasting position holds the toasted slice so that a substantial portion thereof projects from the toasting chamber and, therefore, the slice is subjected to the cooling effects of the surrounding air. If the slice is not used at once it will quickly become cool.

This invention contemplates the provision of an improved automatic toaster constructed and arranged so that at the end of the toasting interval the toasted slice may at the will of the operator be kept within the toasting chamber and maintained warm by the residual heat of the toaster.

In accordance with this invention in one form thereof, the toaster is provided with a suitable stop member constructed and arranged to cooperate with the slice-holder so that when the stop member is moved to a stop position it limits the movement of the slice-holder toward the non-toasting position at the end of the toasting interval so as to keep the slice within the toasting compartment. Biasing means are provided for biasing the stop member to its stop position. A manually operable member is provided which coacts with the stop member so that when this lever is in one position it forcibly holds the stop member out of its stop position against the force of the biasing means, and when it is moved to another position it permits the stop member to be moved to its stop position by its biasing means.

In one specific form of this invention, the manually operable control member carries a pin which is arranged to be received in either one of a pair of recesses provided in the stop member. When the pin is received in one of the notches it forcibly holds the stop member out of its stop position and when it is moved into the other it permits the stop member to move to its stop position by the biasing means.

For a more complete understanding of this invention, reference should be had to the accompanying drawings in which Fig. 1 is a side elevation of an automatic electric toaster embodying this invention, parts being shown in section and other parts being broken away so as to illustrate certain details of construction; Fig. 2 is a front elevation of the electric toaster of Fig. 1, parts being broken away so as to illustrate certain details of construction; Fig. 3 is a front elevation of the toaster mechanism of Figs. 1 and 2, the outer casing of the toaster being removed; Fig. 4 is a view similar to Fig. 3, but illustrating certain parts of the toaster mechanism in different operative positions; Fig. 5 is a front elevation of a thermally operable timing mechanism used in controlling the toaster of Figs. 1-4 inclusive, and drawn on a larger scale than Figs. 1-4; Fig. 6 is a side elevation of the timing mechanism of Fig. 5; Fig. 7 is a fragmentary view of a portion of the timing mechanism of Figs. 5 and 6; Figs. 8 and 9 are fragmentary side elevations illustrating a portion of the mechanism shown in Fig. 6, the parts occupying different operative positions in the two figures respectively; Fig. 10 is a plan view of portions of the toaster mechanism; and Fig. 11 is a diagrammatic representation of the heating elements of the toaster and certain of the control means therefor.

Referring to the drawings, this invention has been shown in one form as applied to the automatic electric bread toaster described and claimed in the copending application of Heber L. Newell, Serial No. 414,129 filed October 8, 1941, and assigned to the assignee of this invention. As there described, this toaster comprises a pair of heating chambers 10 (Fig. 2) spaced apart cross-wise of the toaster, and which are housed in an outer casing 10a. The outer casing is provided with openings 10b through which the slices are inserted into the heating chambers. Each heating chamber is provided with a pair of spaced heating elements 11 arranged on opposite sides of the heating chamber so that they may apply heat to the opposite sides of a piece of bread inserted in the heating chamber. Suitable slice-holders 12 (Fig. 3) are mounted within the toasting chambers 10 for supporting the slices. These holders are adapted to be moved from upper non-toasting positions to lower toasting positions in the heating chambers. It will be understood that when the holders are in their non-toasting positions, they will support the slices so that relatively large portions thereof will project through the openings 10b.

The slice-holders 12 at their forward ends are provided with portions that project forwardly into a chamber 13 at the front of the heating chambers 10. These portions are attached to a suitable supporting carriage 14 which is mounted for vertical sliding movement upon a supporting rod 15 positioned vertically within the chamber 13.

Mounted within the chamber 13 is a relatively strong tension spring 16 whose function is to bias the carriage 14 upwardly and thereby the trays 12 to their non-toasting positions in the heating chambers. This spring is anchored at its upper end to a bracket 17 and at its lower end is anchored to the carriage 14.

A main control knob or handle 18, located outside of the front wall of the toaster, is connected to the carriage 14 for moving it from its upper non-toasting position to its lower toasting position. This handle, as shown, is connected to the carriage by means of a tongue 19 which is connected with the carriage.

The tongue 19 is mounted upon a plate-like bracket 20 which in turn is mounted upon the carriage 14. As shown, the bracket at its upper end is provided with hinge lugs 21 which are hinged to the carriage 14 by means of slots 22 in the carriage. The front plate of the carriage 14 is provided with a stop 23 which projects through a slot 23a provided for it in the bracket 20 and which engages a wall of the bracket to limit the pivotal movement of the bracket on the hinges 21 outwardly away from the plate. By reason of the foregoing arrangement, the lower end of the bracket 20 can be pivoted outwardly away from the carriage 14 for a limited distance.

The carriage 14 not only functions to control the position of the slice-holders, but it also functions to control a main control switch 24 connected in the energizing circuit of the toaster heating elements 11. This switch comprises a pair of fixed contacts 24a (Figs. 1, 3, 4 and 10), and a bridging contact 24b which is carried by a spring arm 25, which by its inherent resiliency yieldingly holds the bridging contact out of engagement with the fixed contacts. The carriage 14 at its lower end carries a depending arm 26 (Figs. 3 and 10) which engages the arm 25 to depress it from its position of Fig. 3 to its position of Fig. 4 so as to close the switch 24 when the bread slices are lowered.

The carriage is held down in its toasting position against the force of the spring 16 by means of a hold-down latch 27 (shown more clearly in Figs. 3 and 4) which is pivotally mounted at its upper end to the front face plate of the carriage 14. This latch can be moved vertically with reference to the carriage for a limited distance and it is biased upwardly by a spring (not shown), as fully described in the above-mentioned Newell application.

Projecting inwardly from the lower end of the rear face of the hold-down latch 27 is a locking projection 28. This projection is arranged to be engaged by a latch arm 29 of a suitable thermally operable timing mechanism. This latch arm is pivoted upon a suitable upright bracket 29a; and it is provided with a pair of vertically spaced locking steps or surfaces 30 and 31. The step 30 is adapted to engage the projection 28 on the hold-down latch 27 so as to lock the carriage 14 in its toasting position. For this purpose, the latch arm 29 is moved downward from its position of Figs. 3 and 5 to its position of Fig. 4, that is, from its dotted line position of Fig. 7 to its solid line position of this figure, when the carriage is lowered. The carriage 14 carries a loading arm 32 for depressing the latch arm 29 when the carriage is lowered. This arm is pivotally mounted at its upper end to the carriage 14 so that when the carriage is depressed the lower end of the loading arm engages the latch arm 29 to depress it. Thus, when the carriage is depressed, the loading arm moves the latch arm to its depressed locking position (Figs. 4 and 7), and then the projection 28 engages the latch arm, pivots the hold-down latch away from the carriage and finally falls in below the step 30.

When the carriage 14 has been depressed and latched by means of the arm 29, the loading arm 32 is automatically withdrawn from the position above the latch arm by the hold-down latch 27 when it is moved vertically with reference to the carriage 14 in the manner fully described in the above Newell application.

The latch arm 29 is secured in its lower full line locking position of Figs. 4 and 7 against the force of the spring 16 by means of pivoted trip-out latches 33 and 34 between which the latch arm is received, as shown. These latches are pivoted upon a suitable plate 34a. Intermediate their ends, the trip-out latches 33 and 34 are provided with hooks or abutments 35 and 36 respectively, which function to successively engage the latch arm to hold it down; as shown, the abutment 36 is spaced slightly above the abutment 35. Interposed between the upper ends of the trip latches beyond their pivotal mountings is a suitable compression spring 37 which biases these upper ends apart, as viewed in Figs. 6, 8 and 9, that is, biases their lower ends together.

The trip latches 33 and 34 are controlled by a suitable temperature responsive bimetallic element 38 which is mounted loosely in a suitable bracket 39. Movement of the left-hand end of the bimetallic element, as viewed in Figs. 3, 4 and 5, is limited by means of an abutment 40 and a pivotally mounted adjustable abutment 41. The right-hand end of the bimetal element 38 is received between the lower ends of the trip-out latches 33 and 34.

The bimetallic element 38 is heated to a predetermined high temperature and then cooled down to measure the toasting period, and when heated up to the predetermined temperature it functions to cause the trip latch arm 33 to disengage the latch arm 29 to permit it to be engaged by the trip latch 34, and when it cools down to the predetermined temperature it functions to release the latch arm from the trip latch 34 to terminate the toasting operation. For the purpose of controlling the heating of the bimetallic element there is provided an auxiliary heating element 42 mounted in close relationship to the bimetallic element.

The heating element 42 is controlled by means of a control switch 43; this switch comprises a pair of spaced fixed contacts 44 and 45 and a contact 46 movable between them. The movable contact 46 is mounted upon a spring arm 47. The spring arm 47 normally biases the contact 46 into engagement with the fixed contact 44, but is depressed against the force of its natural bias to engage the contact 45 by means of the latch arm 29 when this arm is depressed responsively to the lowering of the carriage 14 to start the toasting operation. When the switch arm 47 is depressed to close the contact 45, the auxiliary heater 42 is connected directly in series with the main heating elements 11 of the toaster, as shown diagrammatically in Fig. 11. Therefore, both the main elements 11 and the auxiliary elements 42 are energized by the closure of the main switch 24, which closure happens substantially simultaneously with the closing of the contacts 45 and 46.

The heater 42 heats the bimetallic element 38 so as to cause its trip-out latch controlling end to move from its position of Fig. 8 toward its position of Fig. 9. This operation of the bimetallic element will move the trip latches counterclockwise, as viewed in Figs. 8 and 9, and thereby cause the tooth 35 of trip latch 33 to release the latch arm 29, and the tooth 36 of trip latch 34 to move into its path of movement. As soon as this happens the main spring 16 quickly elevates the carriage 14 so that latch arm 29 is brought into engagement with the tooth 36. This operation of the latch arm 29 releases the resilient switch arm 47 so that it opens the contact 45 and closes the contacts 44 and 46; and this operation of the switch short-circuits the heater 42, but maintains the energization of the toaster heating element 11, as will be clear by an inspection of Fig. 11.

It is to be noted here that when the latch arm 29 pivots from the tooth 35 to the tooth 36 it does not release the projection 28 which remains in engagement with the latch arm step 30 during this movement of the latch arm.

When the heater 42 is deenergized, the bimetallic element 38 at once begins to cool and return toward its initial position of Fig. 8. This action of the element moves the trip latches 33 and 34 in the clockwise direction until eventually the tooth 36 will disengage the latch arm 29 to release the carriage 14 and permit it to move upwardly to remove the toasted slices from their toasting positions and move them to their non-toasting positions. It will be understood that when the latch arm 29 is released, the projection 28 will ride up freely over the steps 30 and 31 of the latch arm and will carry the latch arm upwardly with it.

At any time during a toasting cycle the slices may be elevated for inspection by grasping the knob 18 and elevating it slightly. When it is thus elevated it pivots the bracket 20 on the carriage 14 and causes an extension 20a thereon (Figs. 3 and 4) to pivot the hold-down latch 27 outwardly; this causes the projection 28 on the hold-down latch to move away from the step 30 to release the carriage, and hence, the slice carriers. After the inspection, the carriage may be depressed so as to cause reengagement between the projection 28 and the step 30, and the toasting of the slices will be continued.

The means arranged in accordance with this invention for preventing the automatic ejection of the slices at the end of the toasting interval so as to retain the slices in the heating chambers to keep them warm, but which permits the deenergization of the toaster heating elements at the end of this interval, comprises a "keeps-warm" latch 48 which is pivoted to the vertical plate 34a of the timing mechanism, as shown more clearly in Fig. 6. This latch is arranged to be moved from its full line position shown in Fig. 6 to its dotted line position of this figure so that its lower end moves into the path of movement of the latch arm 29 to prevent the ejection of the toast when this arm is released. However, the carriage 14 is permitted to move high enough to open the switch 24 to deenergize the toaster. In order to provide for this short upward movement of the carriage 14, the latch arm is provided with the second step 31, referred to above, and spaced above the step 30. This step functions to engage the projection 28 to prevent the ejection of the toast, but it does permit the carriage 14 to move up sufficiently far to open the switch 24.

The keeps-warm latch 48 is operated between its operable and non-operable positions, that is, between its stopping and non-stopping positions, by means of a keeps-warm lever 49. This lever is pivoted at its rear end to a bracket 50 fastened to the front wall of the toasting chambers, and has its forward end projecting through a vertical slot 51 provided for it in the front wall of the toaster casing 10a. Mounted on the forward end of the lever is a suitable operating knob 52.

The lever 49 carries a pin 53 which is arranged to be received in each of a pair of cam-like recesses 54 and 55 provided in the latch 48. The latch 48 is biased in the clockwise direction, as viewed in Fig. 6, by means of a tension spring 56, one end of which is anchored to the upper end of the latch, as viewed in Fig. 6, and the other end of which is anchored to the plate 34a; in other words, the spring 56 biases the lever 48 to its stopping position wherein its lower end is in position to stop the upward movement of the arm 29 and hence the carriage 14.

When the lever 49 is in its upper position, as viewed in Figs. 2 and 6, the pin 53 is received in the recess 54 so that it forcibly holds the latch 48 in its full line non-stopping position of Fig. 6, and thereby holds its lower end out of the way of the latch arm 29 which may be moved upwardly to permit the automatic ejection of the toast at the end of the toasting period. However, if the knob 52 be depressed so as to move the pin 53 into the recess 55 it will permit the lever 48 to be shifted slightly in the clockwise direction by the spring 56 so as to cause its lower end to move into the path of the latch arm 29 to prevent its upward movement to allow the toast to be ejected in the manner previously described.

If desired, the front wall of the toaster may be provided with suitable indicia to assist the operator in the control of the knob 52—thus the words "Pops-Up" may be placed at the upper end of the slot 51 to indicate that if the knob is in this position the toast will be automatically ejected, while the words "Keeps-Warm" may be placed at the bottom of the slot to indicate that if the knob is down at this end of the slot the toast will remain in the heating chambers and be kept warm.

It is to be noted that if the knob 52 be in its lower "keeps-warm" position so as to prevent the ejection of the toast, the toast may be ejected by elevating the knob 52 to release the catch arm 29 and thereby the projection 28 to permit the toast to be ejected. Alternatively, the toast may be elevated by grasping the knob 18 and elevating it, which in the manner previously described, will remove the projection 28 from the step 31 and thereby permit the ejection of the slice carriers.

It is also to be noted that even if the knob 52 be left in its lower position, it will not in any way effect the operation of the toaster, except to prevent the automatic ejection at the end of the toasting interval. In other words, even if the knob 52 be in its lower position, and the toast when done ejected by the manual operation of the knob 18, this knob 18 may again be depressed to initiate a subsequent toasting operation and to start the timing mechanism to function. The latch arm 29 will be fully depressed and locked by the trip latches 33 and 36, as before, and the timing mechanism will function in exactly the manner previously described to measure the toasting period and to release the latch arm 29 for movement up against the stop lever 48.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. A toaster comprising a toasting chamber, means for heating said chamber, a slice-holder in said chamber movable between a toasting and a non-toasting position, means biasing said holder to its non-toasting position, means for holding said holder in its toasting position, timing means for controlling said heating means to terminate the toasting interval, means actuated by said timing means for releasing said holder at the end of the toasting interval to permit said holder to be moved by said biasing means to the non-toasting position to eject the toast, a stop member, means pivotally mounting said stop member for movement from a first to a second controlling position, means biasing said stop member to said second position, a member operably associated with said slice holder arranged to be engaged by said stop member when it is in said second position to limit the movement of said slice holder to said non-toasting position after the operation of said timing means to terminate the toasting interval and to release said holder so that said toast is maintained in said toasting compartment and kept warm by the residual heat in said compartment, said pivotally mounted stop member having a pair of spaced apart cam-like recesses therein, and a manually operable member provided with a section that is adapted to be received in either one of said spaced recesses so that when said lever is in such a position that said section is received in the first of said recesses it holds said stop member in said first position against the force of said biasing means and when said lever is moved so that said section is received in the second of said recesses it permits said stop member to be moved to said second position by said spring.

2. A toaster comprising a toasting chamber, means for heating said chamber, a slice-holder in said chamber movable between a toasting and a non-toasting position, means biasing said holder to its non-toasting position, a pivoted latch arm having a first and a second engaging surface, a member attached to said slice-holder arranged to be engaged by said first surface when said latch arm is in a first latching position to hold said slice-holder in said toasting position, time element mechanism for controlling said heating means to terminate the toasting interval and for holding said latch arm in said first latching position until the end of said toasting interval at which time it releases said latch arm to permit said slice holder to be moved by said biasing means to the non-toasting position to eject the toast, a stop member movable to a stop position to engage said latch arm after it is released by said timing mechanism and said toasting interval has been terminated thereby to stop it in a second latching position in which said member engages said second surface on said latch arm to limit the movement of said slice holder toward said non-toasting position so that said toast is maintained in said toasting compartment and kept warm by the residual heat in said compartment, means biasing said stop member to said stop position and a manually operable control member constructed and arranged so that when it is in one position it engages said stop member forcibly to hold it out of said stop position against the force of said biasing means, and when moved to another position to provide for the movement of said stop member to said stop position by said biasing means.

3. A toaster comprising a toasting chamber, means for heating said chamber, a slice-holder in said chamber movable between a toasting and a non-toasting position, means biasing said holder to its non-toasting position, means for holding said holder in its toasting position, timing means for controlling said heating means to terminate the toasting interval, means actuated by said timing means for releasing said holder at the end of the toasting interval to permit said holder to be moved by said biasing means to the non-toasting position to eject the toast, a stop lever, a fixed pivot supporting said stop lever for movement of one end thereof to a stop position, a member operably associated with said holder arranged to be engaged by said end to limit the movement of said holder to said non-toasting position after the operation of said timing means to terminate the toasting interval and to release said holder so that said toast is maintained in said toasting compartment and kept warm by the residual heat in said compartment, and further so that said stop lever can be pivoted to move said end away from said stop position to permit said slice holder to move to its non-toasting position, a spring attached to the other end of said stop lever for forcing said one end into said stop position, and said other end being provided with a pair of spaced apart recesses, a manually operable pivoted lever provided with a pin arranged to be received in said recesses selectively by the movement of said lever between a pair of controlling positions, said stop and manually operable levers being so positioned with relation to each other and said recesses being so positioned in said stop lever that when said pin is in one of said recesses it forcibly holds said stop lever in such a position that said one end is removed from its stop position and when said pin is moved into the other of said recesses said stop member is permitted to be moved by said spring so as to carry said one end to said locking position.

WALTER R. WEEKS.